April 15, 1958

W. G. WADEY 2,831,047

PRESSURE SEAL FOR RADIO-FREQUENCY
TRANSMISSION LINES

Filed Jan. 29, 1952

INVENTOR.
WALTER G. WADEY
BY
ATTORNEYS

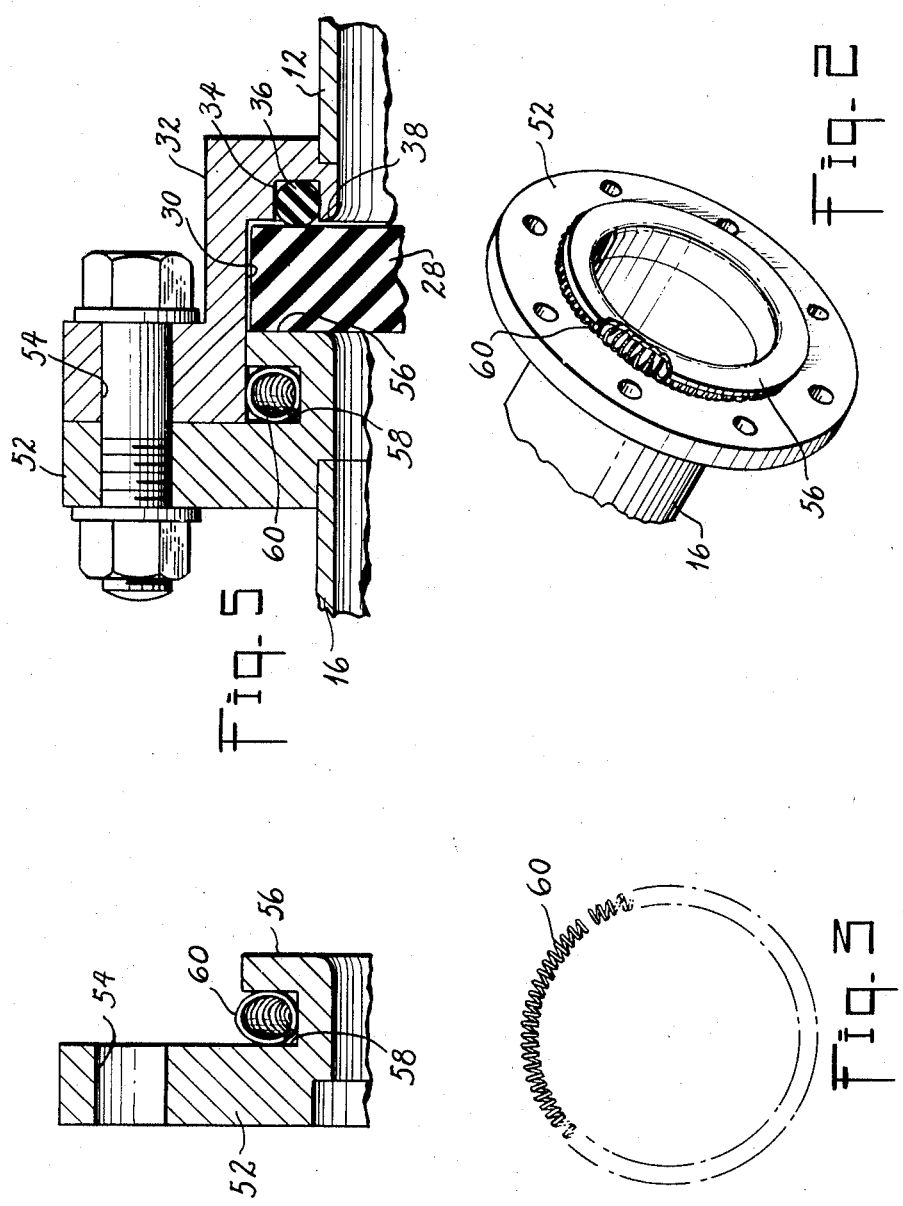

United States Patent Office 2,831,047
Patented Apr. 15, 1958

2,831,047

PRESSURE SEAL FOR RADIO-FREQUENCY TRANSMISSION LINES

Walter G. Wadey, Hamden, Conn., assignor, by mesne assignments, to the United States of America as represented by the Secretary of the Navy Application January 29, 1952, Serial No. 268,861

3 Claims. (Cl. 174—22)

The present invention relates to electromagnetic wave transmission, and more specifically to apparatus for conducting high-frequency energy from one section of a coaxial line to another section thereof under predetermined conditions and with negligible loss of power.

In a coaxial conductor adapted to transmit R.-F. energy at high power levels, it is frequently desirable to increase the operating efficiency of the line by a partial evacuation of, or introduction of gas under pressure into, the space between the inner and outer concentric conductors. When such a line is made up of a number of coupled sections, it is obviously essential for each junction point to be provided with a pressure seal, so that the gas-tight characteristic of the line may be maintained. Attempts have been made to provide satisfactory seals by employing disk-like insulators between the inner and outer line conductors, each insulator usually being held in place by gaskets of metal or thermoplastic material. However, in such cases, it has been found that poor electrical contact, especially between the outer conductors, is a common fault and in addition the high dielectric constant of the gasket material causes reflection losses which lower the system efficiency. Then, too, if the sealing composition is of plastic, it is subject to deterioration with a consequent objectionable introduction of gas into the enclosed line. Finally, absorption of energy by the sealing material adds to the above factors to make the problem a serious one.

In accordance with a feature of the present invention, a pressure seal for R.-F. transmission lines is provided which eliminates the disadvantages set forth above. Furthermore, a method of mounting the insulator disk is employed which allows the latter to effectively "float," thus precluding the application thereto of any mechanical stress to which the transmission line itself may, within limits, be subjected. This permits the use of an insulator disk formed of ceramic material having low strength for shear stresses without introducing the possibility that the insulator will be damaged when the line is subjected to limited bending or twisting.

Another advantageous feature of the present invention resides in the provision of a low-loss conductive connection between the outer conductors of a pair of coupled line sections. It is recognized by workers in the art that mere mechanical contiguity does not assure proper electrical contact at high frequencies, and that some more intimate connection is required. Consequently, in the present disclosure a helically-wound spring ring is disposed in a groove formed in the extended outer conductor of one line section. When the outer conductor of the other line section is fitted into place, the spring ring is effectively subjected to a shear displacement from its original helical shape. However, the amount of such displacement is not so great as to prevent the spring ring from assuming its original configuration when and if the two line sections are again separated. By means of such a design, arcing or power leakage between line sections is completely eliminated for all practical purposes and re-use of the spring ring for any desired number of line separations and re-connections is made possible.

With a line-coupling arrangement as set forth herein, the connection may be made without requiring special tools or techniques. No advance preparation of the ceramic insulator (such as tinning for soldering) is necessary. In addition to being economical to manufacture, the assembly will not leak and will not release gas into the line when the system is operated at high power levels. Moreover, breakage and other damage to the ceramic insulator is greatly reduced by the "free-floating" design of the mounting assembly, while the spring ring contact assures an essentially perfect electrical path along the outer conductor with no appreciable loss due to energy reflection.

One object of the present invention, therefore, is to provide an improved pressure seal for high-frequency transmission lines.

Another object of the present invention is to provide an insulator for coaxial transmission lines that is so mounted as to be substantially free of limited mechanical stress applied to the line.

Another object of the present invention is to provide an electrical contact between a pair of transmission line sections in which the power loss is reduced to a minimum and the possibility of arcing eliminated.

A still further object of the present invention is to provide a coupling mechanism for coaxial lines that may be separated and then reassembled without requiring additional parts and without loss in efficiency.

Other objects and advantages of the invention will be apparent from the following description of a preferred embodiment and also from the drawings, in which:

Fig. 2 is a perspective view of a portion of the pressure-sealing assembly of Fig. 1;

Fig. 3 is a perspective view of the spring ring of Figs. 1 and 2;

Fig. 4 is an enlarged view of a portion of Fig. 1 showing the configuration of the spring ring when the line sections are unassembled; and Fig. 5 shows the manner in which the spring ring of Fig. 4 is compressed when the two line sections are coupled together in the manner of Fig. 1.

Figure 1:
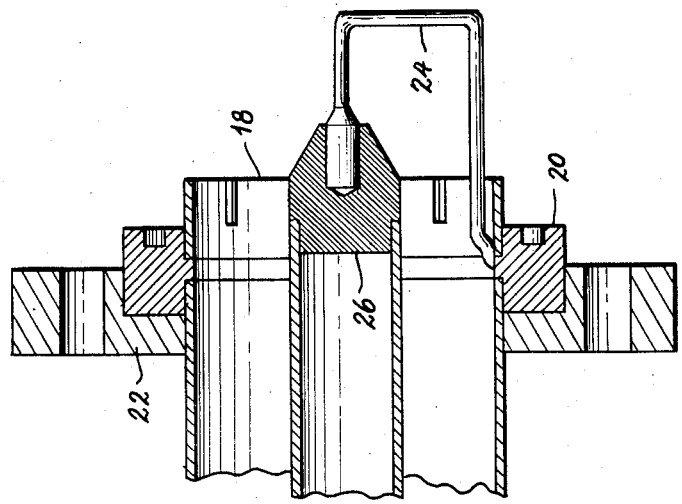
Fig. 1 is a sectional view of a portion of two coupled coaxial transmission line sections showing a pressure seal designed in accordance with the invention.
Figure 1:
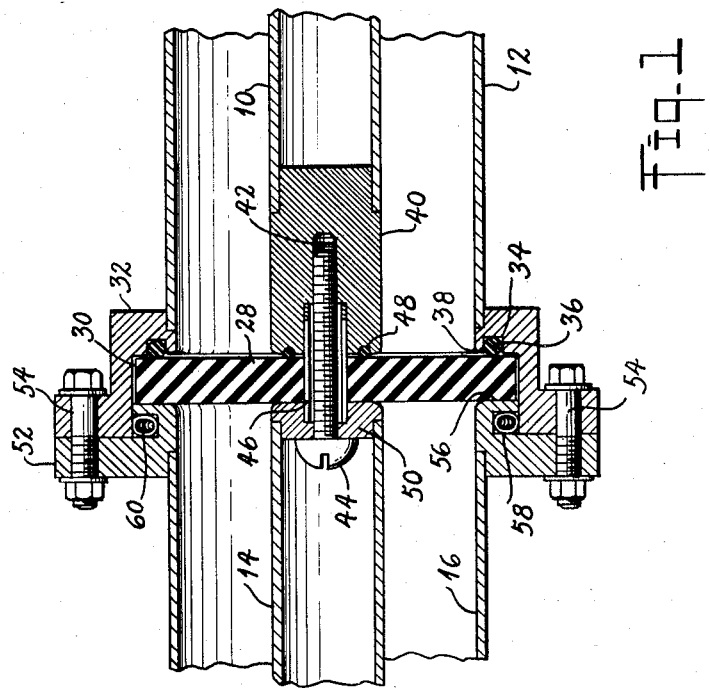

In the drawing there is shown one preferred form of pressure seal in accordance with the present disclosure. Although it is shown as applied to a coaxial transmission line, it will be recognized that it may be incorporated in many other forms of high-frequency apparatus, such as wave guides, cavity resonators, etc.

A coaxial transmission line of the type to which the present invention is applicable may be made up of any number of coupled sections. However, since the invention may be described in connection with a single coupling unit, only two sections of the line have been illustrated in the drawing. One of these sections is composed of an inner conductor 10 and an outer conductor 12, each of these elements taking the form of brass tubing, for example. Similarly, the other coaxial line section may be made up of an inner conductor 14 and an outer conductor 16. For completeness of description, the line formed by the conductors 10, 12, 14 and 16 is shown as constituting a cavity input loop assembly designed for incorporation into a linear electron accelerator. Hence, one end of the line is provided with a finger ring 18 held in place by a seal flange 20, the latter being designed for engagement with a corresponding flange (not shown) comprising part of the energy source. A bolt flange 22 maintains such engagement. The inner conductor 10 of the line is electrically connected to the outer conductor 12 in this region by means of a loop 24, one end of the latter being soldered to the finger ring 18. The other end of the loop 24 is provided with a cap 26 into which the inner conductor 10 is plugged. However, it is to be understood that the elements 18 through 26 of the drawing are set forth for illustrative purposes only, and that no portion of applicant's invention resides therein.

The pressure seal unit of the present disclosure includes an insulator disk 28 disposed between the two coaxial line sections. This disk is preferably composed of some ceramic material such as steatite, although it need not have a high resistance to shear pressure for reasons which will appear hereinafter. The disk 28 fits into a recess 30 in a flange 32 which is carried by the outer line conductor 12. Flange 32 also has a further recess 34 formed therein which is adapted to receive a ring 36 of rubber or other resilient material. Since flange 32 is designed with a shoulder portion 38 forming an extension of the tubular outer conductor 12, the recess 34 in effect constitutes a groove in the flange 32 within which the resilient ring 36 lies.

The cross-sectional diameter of the ring 36 is so chosen that a portion thereof would normally extend outside of the recess 34 were it not for the presence of the insulator disk 28. Hence, when the latter is in position, it is resiliently maintained in place by the compressed ring. To preclude any possibility that the "cushioning" action of the ring 36 will be ineffective upon a bending or twisting of the transmission line, the insulator disk 28 has an outer diameter slightly less than the diameter of the recess 30 in the flange 32, thus permitting a limited movement of the former within the recess. Thus, the insulator disk 28 actually "floats" on the resilient ring 36.

This "floating" construction must apply as well between the insulator disk and the inner conductor 10, although to a lesser degree because of the smaller relative movement of the parts. A terminating member 40 (preferably formed of brass) is plugged into that end of the conductor 12 in closest proximity to the insulator disk 28. This terminating member, or plug, 40 is centrally threaded at 42 to receive a bolt 44, and in addition the bolt opening is provided with a finger ring 46 which tends to insure a good electrical path between the inner line conductors 10 and 14. The finger ring 46, as shown, passes through the opening in disk 28, and then the bolt 44 in turn passes through the ring 46. This construction is best shown in Fig. 1 of the drawing.

A second resilient ring 48, also of rubber or similar material, is positioned within an annular recess in the plug 40, so that the surface of disk 28 contacts this ring 48 instead of the forwardly extending portion of the plug. Thus, not only is a limited "rocking" movement permitted between disk 28 and the flange 32, but between the disk 28 and the plug 40 as well. There is enough "free play" between the bolt 44 and the finger ring 46 so that substantially no stress is applied to the ceramic insulator disk by such a limited movement of the plug 40 resulting from a corresponding movement of the line conductors 10 and 14.

A terminating member 50, which is plugged into the inner conductor 14, corresponds generally to the terminating member 40 of conductor 10, and has a central opening which permits passage of the bolt 44. It will now be appreciated that the finger ring 46 serves to establish an intimate electrical contact between the two plug members 40 and 50.

To preclude the possibility of leakage of any gas with which either or both the transmission line sections may be filled, or, alternatively, to maintain an evacuated condition of either section, it is necessary that the insulator disk 28 be in firm engagement with the resilient rings 36 and 48. For this purpose there is provided a further flange 52, which is adapted for bolting to the insulator-carrying flange 32 through a plurality of aligned openings 54.

The flange 52 forms in effect an extension of the outer conductor 16 of the left-hand line section in the drawing. It is provided not only with a planer portion 56 against which one surface of the insulator disk 28 rests, but also with an annular recess 58 designed to receive a spring ring 60 formed of such material as Phosphor bronze wire. This spring ring 60 is of helical configuration, as best shown in Fig. 3, and normally lies so that a portion thereof extends outside of the recess 58 as shown in Figs. 2 and 4. However, when the two flanges 32 and 52 are placed in face-to-face relationship during assembly of the transmission line, the spring ring 60 is compressed in a shear displacement, as shown in detail in Fig. 5. This compression of the ring 60 forces it into tight contact with all four walls of the enclosure formed by the two flanges 32 and 52, thus preventing the formation of an arc when the line is operated at high power levels. Furthermore, although the ring is compressed when it is in the position shown in Figs. 1 and 5, there is no permanent distortion thereof, and it resumes its original shape when the flanges 32 and 52 are separated.

In order that no electrical discontinuity appear which will tend to produce reflections at the point where the transmission line sections are coupled together, the diameters of the flanges 32 and 52, as well as the dimensions of the other electrical parts, are so chosen as to compensate for the particular dielectric constant of the ceramic insulator 28.

Having thus described my invention, I claim:

1. Apparatus for pressure-sealing two coupled sections of a coaxial transmission line comprising a flange member circumferentially fixed to one end of one of said coupled sections, a shoulder member integrally joined with and concentric with said flange member whereby an annular shoulder of lesser diameter than the outer diameter of said flange member is provided, an insulation disk of lesser diameter than the diameter of said annular shoulder coaxially disposed with respect to and seated against the outer end surface of said shoulder member, a second flange member circumferentially fixed to one end of the other of said coupled sections, said second flange member being integrally formed with a concentric, outwardly-extending portion of internal diameter substantially equal to the outer diameter of said shoulder member whereby an annular seat is provided in said second flange member, an annular groove in said annular seat, a ring of resilient material disposed in said groove, means for securing said flange members together in coaxial alignment, said disk being in spaced relation with respect to said annular seat but in contact with said ring, the end of the inner conductor of said one of said coupled sections being disposed in abutting relation to one side of said disk and the end of the inner conductor of said other of said coupled sections being spaced apart from the other side of said disk, and including a circular groove in the end of said inner conductor of said other of said coupled sections, a resilient ring in said groove, said ring being compressed against said disk, and means extending through a central aperture in said disk for electrical interconnection, and mechanical support by said disk, of said inner conductors, whereby a resilient pressure seal is provided between said coupled sections.

2. Apparatus for pressure sealing two coupled sections of a coaxial transmission line, said apparatus comprising an insulator disk against the ends of the inner and outer conductors of one of said sections, the end of the outer conductor of the other section being cup-shaped and fitting over but spaced from said disk, and annular resilient sealing members between said disk and the end of the inner conductor of said other section and between said disk and the bottom of said cup-shaped end.

3. Apparatus for pressure sealing two coupled sections of a coaxial transmission line, said apparatus comprising a ceramic disk against the ends of the inner and outer conductors of one of said sections, the end of the outer conductor of the other section being cup-shaped and fitting over but spaced from said disk, and annular resilient sealing members between said disk and the end of the inner conductor of said other section and between said disk and the bottom of said cup-shaped end.

References Cited in the file of this patent

UNITED STATES PATENTS

| | | |
|---|---|---|
| 2,203,806 | Wolf | June 11, 1940 |
| 2,294,738 | Bruno | Sept. 1, 1942 |
| 2,368,566 | Peterson | Jan. 30, 1945 |
| 2,376,725 | Richardson et al. | May 22, 1945 |
| 2,407,076 | Harkness | Sept. 3, 1946 |
| 2,422,190 | Fiske | June 17, 1947 |
| 2,449,073 | Johannesen | Sept. 14, 1948 |
| 2,449,479 | Hopper | Sept. 14, 1948 |
| 2,468,783 | Schwartz | May 3, 1949 |
| 2,469,474 | Perry | May 10, 1949 |
| 2,469,857 | Allyn | May 10, 1949 |

FOREIGN PATENTS

| | | |
|---|---|---|
| 572,981 | Great Britain | Nov. 1, 1945 |